United States Patent
Eipper et al.

[11] Patent Number: 5,924,764
[45] Date of Patent: Jul. 20, 1999

[54] FIREWALL FOR A VEHICLE BODY

[75] Inventors: Konrad Eipper, Ammerbuch; Mark Muehlhausen, Stuttgart; Bruno Moeltgen, Tiefenbronn; Matthias Nohr, Stuttgart, all of Germany

[73] Assignee: Mercedes-Benz AG, Stuttgart, Germany

[21] Appl. No.: 08/866,256

[22] Filed: May 30, 1997

[30]   Foreign Application Priority Data

May 31, 1996 [DE]  Germany .......................... 196 21 943

[51] Int. Cl.⁶ .................................................. B60K 37/00
[52] U.S. Cl. ........................... 296/189; 296/194; 296/191
[58] Field of Search .................................. 296/189, 188, 296/191, 194, 185

[56]              References Cited

U.S. PATENT DOCUMENTS 3,827,525  8/1974  Felzer .................................. 296/189 X
4,669,777  6/1987  Harasaki et al. .................... 296/189 X
4,718,712  1/1988  Nakatani .
5,005,898  4/1991  Benedetto et al. .................. 296/191 X

FOREIGN PATENT DOCUMENTS 30 18 732 C2  11/1981  Germany .
34 40 701 C2   5/1986  Germany .
44 24 288 A1   1/1996  Germany .
   54-5894     3/1979  Japan .

*Primary Examiner*—Joseph D. Pape
*Attorney, Agent, or Firm*—Evenson, McKeown, Edwards & Lenahan, P.L.L.C.

[57]               ABSTRACT

A firewall for a vehicle body including stable rigid side parts in the shape of an inverted U and a deformation insert connected in the part of the open central area of the inverted U. The deformation insert allows at least partial intrusion of assemblies from the engine compartment into the passenger compartment in the event of a vehicle collision. This design permits a shorter front end.

19 Claims, 1 Drawing Sheet

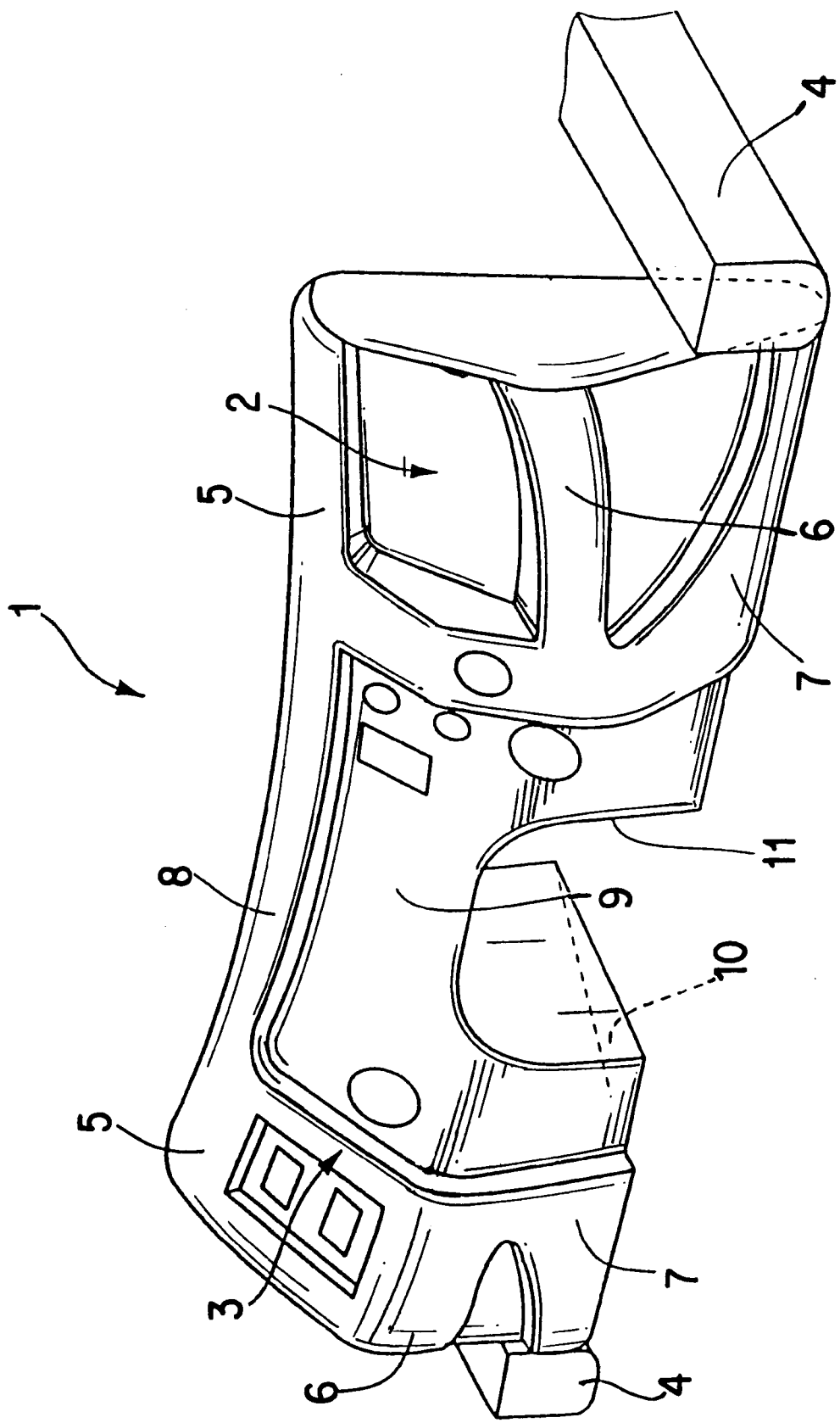

FIREWALL FOR A VEHICLE BODY

BACKGROUND AND SUMMARY OF THE INVENTION

This application claims the priority of German Application No. 196 21 943.4, the disclosure of which is expressly incorporated by reference herein.

The invention relates to a firewall for a vehicle body, especially for an automobile, said wall being provided with deformable partial areas to allow movement of parts located in the engine compartment relative to the firewall.

A firewall for an automobile is known from German Patent Document DE 30 18 732 C2 in which a brake system containing a master brake cylinder connected with the brake pedal by a rod has been provided with a two-stage impact absorber, whose upper absorber is smaller and much stiffer than the lower absorber, which is forced out of the firewall. The pedal shaft for the suspended brake pedal is mounted in the upper area of the upper absorber. With this arrangement, if an impact results in the brake system being forced toward the firewall, the stiffer upper absorber of the impact absorber is pushed into the lower absorber which in turn is forced out of the firewall, taking the pedal shaft with it so that the available deformation travel of the lower absorber is located essentially in its lower area, and the brake pedal pivots forward away from the driver in the direction of the firewall so that it no longer poses a serious danger to the driver. In these designs therefore a deformable area of the firewall is provided in the lateral area of the driver but is used deliberately in the event of a collision involving the vehicle to remove the brake pedal from the area where it would endanger the driver.

The firewall of a motor vehicle should be made rigid because it is part of the passenger compartment and also because it serves to connect the side members; on the other hand it is supposed to deform in case of a collision in order to produce maximum of total deformation in the front structure. This is especially necessary when the engine and other assemblies constitute a nondeformable block, but the front end must simultaneously be kept as short as possible because of the overall vehicle design. The provision of partial deformable impact absorbers on the firewall cannot contribute to solving this problem.

A goal of the invention is to design a firewall especially for an automobile in such fashion that the front end can be made as short as possible while still providing that assemblies located in front of the firewall can be moved into the area of the firewall in the event of a collision in such fashion that the safety of the vehicle occupants is not adversely affected to a significant degree.

This and other goals have been achieved according to the present invention by providing a firewall for a vehicle body, comprising: a rigid frame including first and second side parts connected with each other via at least one linking member, said rigid frame defining a central area; and a deformation insert arranged in said central area and connected with said rigid frame.

This design is based on the idea that the two functions of the firewall, providing rigidity and making provision for deformation, are separated from one another and the firewall is made rigid on both of its lateral areas so that the side members have a stable connection and simultaneously the driver and passenger are protected in the foot area while the central area of the firewall allows intrusion of assemblies located in the engine compartment while absorbing the deformation energy.

According to a preferred embodiment of the invention, the firewall consists of two stable side parts held together at the top by a rigid connecting member and forming with the latter an inverted U-shaped frame that surrounds the deformation insert from above. According to another preferred embodiment, a transverse reinforcement is used to close the open end of the inverted U of the frame in order to achieve higher stability. With such a design, with or without the transverse reinforcement, a clear separation is provided between the deformation area and the rigid area of the firewall. According to another preferred embodiment of the invention, the deformation insert can fit over the tunnel area and be given specific shapes, in the form of deformation cones for example. The entire deformation insert may be fastened releasably to the rigid frame in an especially simple fashion, for example by bolts or rivets that also allow replacement of a deformation insert that has been deformed by an impact. Of course it is also contemplated to connect the deformation insert permanently, by gluing or welding for example, with the rigid side elements and the side members.

Other objects, advantages and novel features of the present invention will become apparent from the following detailed description of the invention when considered in conjunction with the accompanying drawings.

BRIEF DESCRIPTION OF THE DRAWING

The single FIGURE shows the firewall (1) of an automobile as viewed from the engine compartment according to a preferred embodiment of the present invention.

DETAILED DESCRIPTION OF THE DRAWING

Firewall (1) consists of two rigid side parts (2 and 3) that serve to connect the longitudinal frame members or sills (4) and the forward side members, not shown, and are composed in the embodiment of an upper, middle, and lower support (5, 6, and 7). These two side parts (2 and 3) are connected together by a linking member (8) that constitutes the extension of upper member (5). Firewall (1) thus forms a stable inverted U-shaped frame whose legs point downward and which can be connected with the side members and sills. Firewall (1) is also provided with the necessary recesses for allowing a part of the steering column to pass through for example, and for allowing ventilation ducts and the like to pass through, which will not be described in greater detail here.

In the inverted U-shaped frame formed by side parts (2 and 3) and connecting members (8) a deformation insert (9) is fitted that is provided with areas (10) that conically taper rearward and is designed as a whole as a deformation pot, likewise in the shape of a U, that has a central recess (11) that can be adapted to the tunnel area (i.e., the vehicle transmission tunnel). This deformation insert (9) forms the central area of firewall (1) and is provided adjacent to the area of the engine compartment, not shown, in which the engine block and the associated parts are located.

Deformation insert (9) can be made of any materials that have a greater degree of deformability than the basic material of side parts (2 and 3) of firewall (1). The deformation should be primarily plastic in order to absorb energy. The size of deformation insert (9) can be made variable; however it must always ensure sufficient protected space at the sides for the vehicle occupants.

Deformation insert (9) can be connected permanently with side parts (3) and connecting members (8) in such fashion, by gluing or by welding for example, even if deformation insert (9) is made of sheet metal. Deformation insert (9) however can be releasably mounted on the rigid frame formed by side parts (2 and 3) and connecting member (8), by bolting or riveting for example. The latter embodiment opens up the possibility of making the deformation insert replaceable even after a vehicle collision.

In the event of a collision of the motor vehicle it is therefore possible for the engine block or other assemblies in the vicinity of deformation insert (9) to penetrate and deform the latter, with energy being dissipated. Deformation insert (9) therefore, in this design, achieves the goal that could otherwise be reached only by a lengthened front end, with corresponding deformable mounts being provided.

The design however is such that the side areas of firewall (1), i.e. in the vicinity of side parts (2 and 3), are made sufficiently stable to allow them to be connected to the vehicle frame side members, thus producing rigidity of the passenger compartment, and also to provide sufficient rigidity in the area of the legs of the vehicle occupants. As indicated above, it is also contemplated to close off the open "U" of the rigid frame formed by side parts (2, 3) and connecting member (8) by a transverse reinforcement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A firewall for a vehicle body, comprising:
   a rigid frame including first and second side parts connected with each other via at least one linking member, said rigid frame defining a central area; and
   a deformation insert arranged in said central area and connected with said rigid frame, wherein said deformation insert defines a central recess which is adapted to conform to a vehicle tunnel area.

2. A firewall according to claim 3, wherein said rigid frame includes a single of said linking members arranged to connect respective upper portions of said first and second side parts such that said rigid frame forms an inverted U-shaped configuration, an interior of said inverted U-shaped configuration being said central area.

3. A firewall according to claim 2, wherein said deformation insert is made in the form of an inverted U-shaped deformation pot.

4. A firewall according to claim 1, wherein said deformation insert is configured in a deformable shape.

5. A firewall according to claim 4, wherein said deformable shape is conical.

6. A firewall according to claim 1, wherein said deformation insert is releasably mounted on said rigid frame.

7. A firewall according to claim 1, wherein said deformation insert is made of a material having a greater degree of deformability than a material of said rigid frame.

8. A firewall according to claim 1, wherein said first and second side parts each comprise an upper support, a middle support, and a lower support.

9. A firewall for a vehicle body, comprising:
   a rigid frame including first and second side parts connected with each other via at least one linking member, said rigid frame defining a central area; and
   a deformation insert arranged in said central area and connected with said rigid frame, wherein said deformation insert is made in the form of an inverted U-shaped deformation pot.

10. A firewall according to claim 9, wherein said deformation insert is configured in a deformable shape.

11. A firewall according to claim 10, wherein said deformable shape is conical.

12. A firewall according to claim 9, wherein said deformation insert is releasably mounted on said rigid frame.

13. A firewall according to claim 9, wherein said first and second side parts each comprise an upper support, a middle support, and a lower support.

14. A firewall for a vehicle body, comprising:
   a rigid frame including first and second side parts arranged on opposite sides of a central longitudinal vehicle plane, said first and second side parts being connected with each other via at least one linking member extending transversely to said central longitudinal vehicle plane, said rigid frame defining a central area; and
   a deformation insert arranged in said central area and connected with said rigid frame, wherein said deformation insert defines a central recess which is adapted to conform to a vehicle tunnel area.

15. A firewall according to claim 14, wherein said rigid frame includes a single of said linking members arranged to connect respective upper portions of said first and second side parts such that said rigid frame forms an inverted U-shaped configuration, an interior of said inverted U-shaped configuration being said central area.

16. A firewall according to claim 14, wherein said deformation insert is made of a material having a greater degree of deformability than a material of said rigid frame.

17. A firewall according to claim 14, wherein said first and second side parts each comprise an upper support, a middle support, and a lower support.

18. A firewall for a vehicle body, comprising:
   a rigid frame including first and second side parts arranged on opposite sides of a central longitudinal vehicle plane, said first and second side parts being connected with each other via at least one linking member extending transversely to said central longitudinal vehicle plane, said rigid frame defining a central area; and
   a deformation insert arranged in said central area and connected with said rigid frame, wherein said deformation insert is made in the form of an inverted U-shaped deformation pot.

19. A firewall according to claim 18, wherein said first and second side parts each comprise an upper support, a middle support, and a lower support.

* * * * *